United States Patent

Kobayashi et al.

[11] Patent Number: 6,164,070
[45] Date of Patent: Dec. 26, 2000

[54] HYDRAULIC PRESSURE TYPE BOOSTER

[75] Inventors: Michio Kobayashi; Masahiro Shimada; Satoru Watanabe, all of Higashimatsuyama, Japan

[73] Assignee: Jidosha Kiki Co., Ltd., Tokyo, Japan

[21] Appl. No.: 09/173,760

[22] Filed: Oct. 16, 1998

[30] Foreign Application Priority Data

Oct. 16, 1997 [JP] Japan .................................. 9-283692

[51] Int. Cl.⁷ .................................................. B60T 13/00
[52] U.S. Cl. .......................................................... 60/547.1
[58] Field of Search ..................................... 60/547.1, 552

[56] References Cited

U.S. PATENT DOCUMENTS

| | | | |
|---|---|---|---|
| 3,253,409 | 5/1966 | Kellogg et al. | 60/547.1 |
| 4,514,981 | 5/1985 | Brown et al. | 60/547.1 |
| 5,076,141 | 12/1991 | Konishi | 60/547.1 |

FOREIGN PATENT DOCUMENTS 5-84553  11/1993  Japan .

Primary Examiner—F. Daniel Lopez
Attorney, Agent, or Firm—Sughrue, Mion, Zinn, Macpeak & Seas, PLLC

[57] ABSTRACT

The collar 13 for slidably supporting and guiding a valve body of the control valve 55 of the hydraulic pressure type booster 1 is press-fitted into the small diameter portion 9a of the stepped hole 9 of the power piston 8. The valve seat member 10 of the control valve 55 is also press-fitted into the small diameter portion 9a. Further, the small diameter protrusion 6b of the stepped cylindrical protrusion 6a of the plug 6, which divides the power chamber 25, is also press-fitted into the small diameter portion 4a of the stepped hole 4 of the housing 3. In the cylindrical member 17 in which the second valve seat 17a of the control valve 55 is formed, the stopper 17b to restrict a limit of retraction of the input shaft 18 is integrally formed. Further, the cylindrical fixing member 11 to fix the flange 10a of the valve seat member 10 is fixed to the power piston 8 with C ring 12 in the axial direction.

10 Claims, 4 Drawing Sheets

HYDRAULIC PRESSURE TYPE BOOSTER

BACKGROUND OF THE INVENTION

1. Field of the Invention

The present invention relates to a technical field of a hydraulic pressure type booster in which an inputted power is increased to a predetermined value by the action of hydraulic pressure. More particularly, the present invention relates to a technical field of a hydraulic pressure type booster which is formed compact and the structure of which is simplified.

2. Description of the Related Art

In a hydraulic pressure type booster used for a servo assisted brake of an automobile, a high intensity output can be obtained by a low intensity input. An example of this hydraulic pressure type booster incorporated into a brake system of an automobile is disclosed in Japanese Utility Model Application No. 4-33402 (Japanese Unexamined Utility Model Publication No. 5-84553).

FIG. 4 is a view of the hydraulic pressure type booster. In the view, reference numeral 1' is a hydraulic pressure type booster, reference numeral 2' is a housing, reference numeral 3' is a plug, reference numeral 4' is a power piston, reference numeral 5' is a control valve, reference numeral 6' is a valve seat member, reference numeral 7' is a cylindrical fixing member, reference numeral 8' is a nut, reference numeral 9' is a ball valve, reference numeral 10' is a valve body, reference numeral 11' is a cylindrical member, reference numeral 12' is an input shaft, reference numeral 13' is a cylindrical stopper member, reference numeral 14' is a reaction force piston, reference numeral 15' is a power chamber, and reference numeral 16' is an output shaft.

In this hydraulic pressure type booster 1', when it is not operated as shown in FIG. 4, the ball valve 9' of the control valve 5' is seated on the valve seat member 6', and a front end valve portion of the cylindrical member 11' is unseated from the ball valve 9'. Therefore, the power chamber 15' is shut off from an input port 17' which is always connected to a hydraulic pressure source not shown in the view. At the same time, the power chamber 15' is communicated with a chamber 18' which is always connected to a reservoir not shown in the view. Accordingly, no hydraulic pressure is introduced into the power chamber 15', and the power piston 4' is not operated.

When an input is given to the booster which is in the above non-operating condition, the input shaft 12' is moved forward. Then the cylindrical member 11' is also moved forward, and the front end valve portion of the cylindrical member 11' comes into contact with the ball valve 9' of the control valve 5', and the ball valve 9' is pushed, so that the ball valve 9' is unseated from the valve seat member 6'. Due to the foregoing, the power chamber 15' is communicated with the input port 17' and shut off from the chamber 18'. Therefore, hydraulic fluid is introduced into the power chamber 15', and the power piston 4' is operated. When the power piston 4' is operated, power is outputted from the output shaft 16' of the hydraulic pressure type booster 1'. Therefore, a piston of a master cylinder (not shown) is operated, and the master cylinder generates a braking hydraulic pressure. When the hydraulic pressure in the power chamber 15' is increased to a predetermined value, the ball valve 9' is seated on the valve seat member 6'. Therefore, an input of the hydraulic type booster 1' is multiplied, and an output of the hydraulic type booster 1' becomes the multiplied value.

The reaction force piston 14' is pushed backward by the hydraulic pressure in the power chamber 15', resisting a force generated by the spring 19'. In the initial stage in which hydraulic pressure in the power chamber 15' is still low, the reaction force piston 14' does not come into contact with a step portion 12'a of the input shaft 12'. Accordingly, a multiplying factor of the hydraulic pressure type booster is high, and the jumping action is conducted. When hydraulic pressure in the power chamber 15' is increased to a predetermined value, the reaction force piston 14' comes into contact with the step portion 12'a of the input shaft 12'. After that, the multiplying factor of the hydraulic pressure type booster decreases and becomes a normal value.

When no input is given to the hydraulic pressure type booster, the input shaft 12' is retracted by a return spring, not shown in the drawing. Therefore, the cylindrical member 11' is also retracted, and the front end valve portion of the cylindrical member 11' is unseated from the ball valve 9' of the control valve 5'. Due to the foregoing, the power chamber 15' is shut off from the input port 17 and communicated with the chamber 18'. Therefore, hydraulic pressure introduced into the power chamber 15' is discharged into the reservoir, and the power piston 4' is retracted by the action of the return spring 20'. When the cylindrical stopper member 13' fixed to the input shaft 12' comes into contact with the stopper 25' of the plug 3', the input shaft 12' can not be retracted any more, that is, the input shaft 12' reaches a limit of retraction, and the hydraulic pressure type booster returns to the non-operating condition shown in the view. When hydraulic pressure introduced into the power chamber 15' is completely discharged, the power piston 4' also returns to the non-operating condition shown in the drawing. Therefore, no output is provided by the hydraulic pressure type booster 1' and the master cylinder is also put into a non-operating condition.

However, in the above conventional hydraulic pressure type booster 1', there are respectively provided O rings 22', 23', 24' for holding hydraulic tightness between an outer circumference of the collar 21' for slidably holding the valve body 10' to hold the ball valve 9' and the hole of the power piston 4' in which the collar 21' is engaged, and also between an outer circumference of the valve seat member 6' and the hole of the power piston 4' in which the valve seat member 6 is engaged, and also between an outer circumference of the plug 3' and the hole of the housing 2' in which the plug 3' is engaged.

Accordingly, the following problems maybe encountered. Outer diameters of the collar 21', valve seat member 6' and plug 3', to which O rings 22', 23', 24' are respectively attached, become large, and their lengths in the axial direction become long. Due to the foregoing, dimensions of the hydraulic pressure type booster 1' are increased.

Since the cylindrical member 11' is inserted and fixed to the cylindrical stopper member 13', the structure becomes complicated, and further fluctuation is caused in a clearance between the ball valve 9' and the front end valve portion of the cylindrical member 11'.

Further, the cylindrical fixing member 7' is fixed to the power piston 4' with the nut 8'. Therefore, length of the power piston 4' is increased because of this nut 8'. In other words, not only the length of the hydraulic pressure type booster 1' is increased in the axial direction, but also its assembling work becomes complicated.

SUMMARY OF THE INVENTION

The present invention has been accomplished to solve the above problems. It is an object of the present invention to provide a hydraulic pressure type compact booster, the structure of which is simple so that the assembling work can be simplified.

It is another object of the present invention to provide a hydraulic pressure type booster in which it is possible to reduce the fluctuation of the clearance of the control valve.

In order to solve the above problems, a first embodiment of the present invention provides a hydraulic pressure type booster comprising: a hydraulic pressure source for generating hydraulic pressure; a reservoir for storing hydraulic fluid; an input shaft operated when power is inputted into it; a control valve operated by the input shaft; a power chamber shut off from the hydraulic pressure source and communicated with the reservoir when the control valve is not operated, the power chamber being shut off from the reservoir and communicated with the hydraulic pressure source when the control valve is operated, so that hydraulic pressure is introduced into the power chamber from the hydraulic pressure source; a power piston operated by hydraulic pressure in the power chamber, the control valve being disposed in the power piston; a valve body in which the control valve is slidably guided and supported by a collar engaged in a hole formed in the power piston; a first valve seat formed in a valve seat member engaged in the hole formed in the power piston, a valve of the valve body being seated to and unseated from the first valve seat, the valve body being seated to the first valve seat so that the hydraulic pressure source and the power chamber are shut off from each other when the control valve is not operated, the valve body being unseated from the first valve seat so that the hydraulic pressure source and the power chamber are communicated with each other when the control valve is operated; and a second valve seat disposed in a cylindrical member connected with the input shaft, the valve of the valve body being seated to and unseated from the second valve seat, the valve body being unseated from the second valve seat so that the power chamber and the reservoir can be communicated with each other when the control valve is not operated, the valve body being seated to the second valve seat so that the power chamber and the reservoir can be shut off from each other when the control valve is operated, wherein the power chamber is formed when the hole in the housing is closed by a plug, and at least one of the collar, valve seat member and plug is press-fitted into the corresponding hole.

According to a second embodiment of the present invention, a stopper section to restrict a limit of retraction of the input shaft when it comes into contact with the plug is integrally formed in the cylindrical member.

According to a third embodiment of the present invention, a cylindrical fixing member for fixing the valve seat member in the axial direction is disposed in the hole of the power piston, and the cylindrical fixing member is fixed in the axial direction by a snap ring attached onto an inner surface of the hole of the power piston.

In the hydraulic pressure type booster according to the first embodiment of the invention, at least one of the collar, valve seat member and plug, which composes the control valve, is press-fitted into the corresponding hole. Accordingly, a clearance formed between the outer circumferential surface of at least one of the collar, valve seat member and plug, and the inner circumferential surface of the hole into which at least one of them is inserted can be sealed by press-fitting without using a sealing member such as O ring. Due to the foregoing, it is possible to eliminate a sealing member such as O ring, and it becomes unnecessary to provide a space in which the sealing member is disposed. Therefore, sizes of the collar, valve seat member and plug in the radial and the axial direction can be reduced.

Due to the foregoing, the hydraulic pressure type booster can be made compact in the radial and the axial direction.

Further, it is unnecessary to arrange a sealing member. As a result, the number of parts can be reduced, and it is possible to eliminate a machining process in which the sealing member attaching portion is machined.

According to a second embodiment of the invention, the stopper portion to restrict the limit of retraction of the input shaft is formed integrally with the cylindrical member. Accordingly, the cylindrical stopper member of the conventional hydraulic pressure type booster is not required, and the structure in the second valve seat of the cylindrical member and further the structure of the restricting portion of limit of retraction of the input shaft can be simplified, and further the number of parts can be reduced, and furthermore the cylindrical member can be easily incorporated into the booster.

Further, the cylindrical member and the stopper portion are integrated with each other. Therefore, relative positions of the second valve seat of the cylindrical member and the stopper can be determined with accuracy. Therefore, a clearance between the valve of the control valve and the second valve seat can be accurately and stably ensured at the position of limit of retraction of the input shaft. Accordingly, the occurrence of fluctuation of this clearance can be prevented.

According to a third embodiment of the invention, the cylindrical fixing member is fixed to the power piston with the snap ring. Consequently, compared with the conventional structure in which the cylindrical member is fixed by the nut, it is possible to reduce the overall length of the hydraulic pressure type booster, and further it is simpler to attach the snap ring than the nut. Therefore, the assembling property of the booster can be enhanced.

DETAILED DESCRIPTION OF THE PREFFERED EMBODIMENTS

Figure 1:
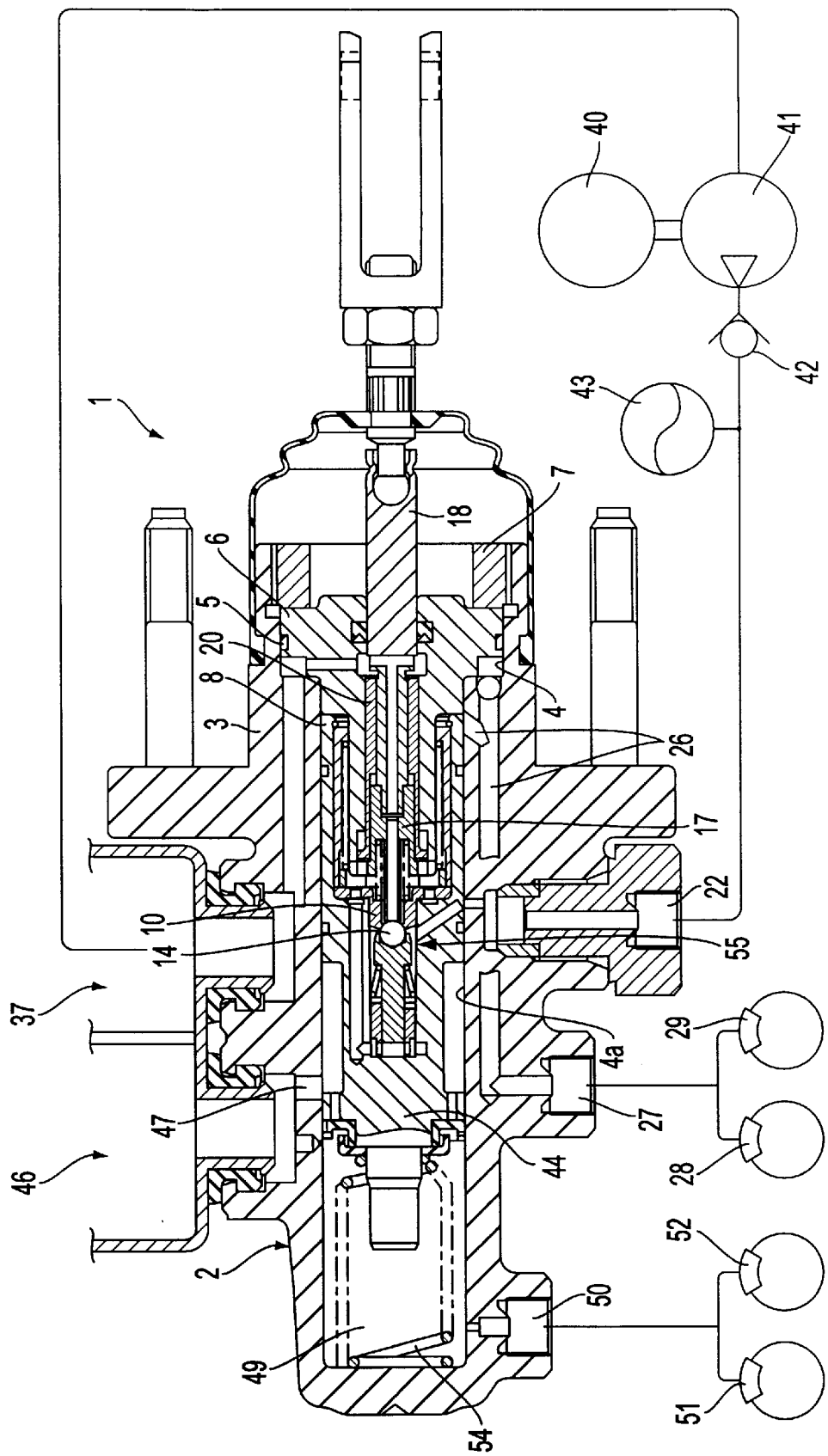
FIG. 1 is a cross-sectional view showing an example of the embodiment of the hydraulic pressure type booster of the present invention.

The description will be given of an embodiment of the present invention referring to the drawings.

Figure 2:
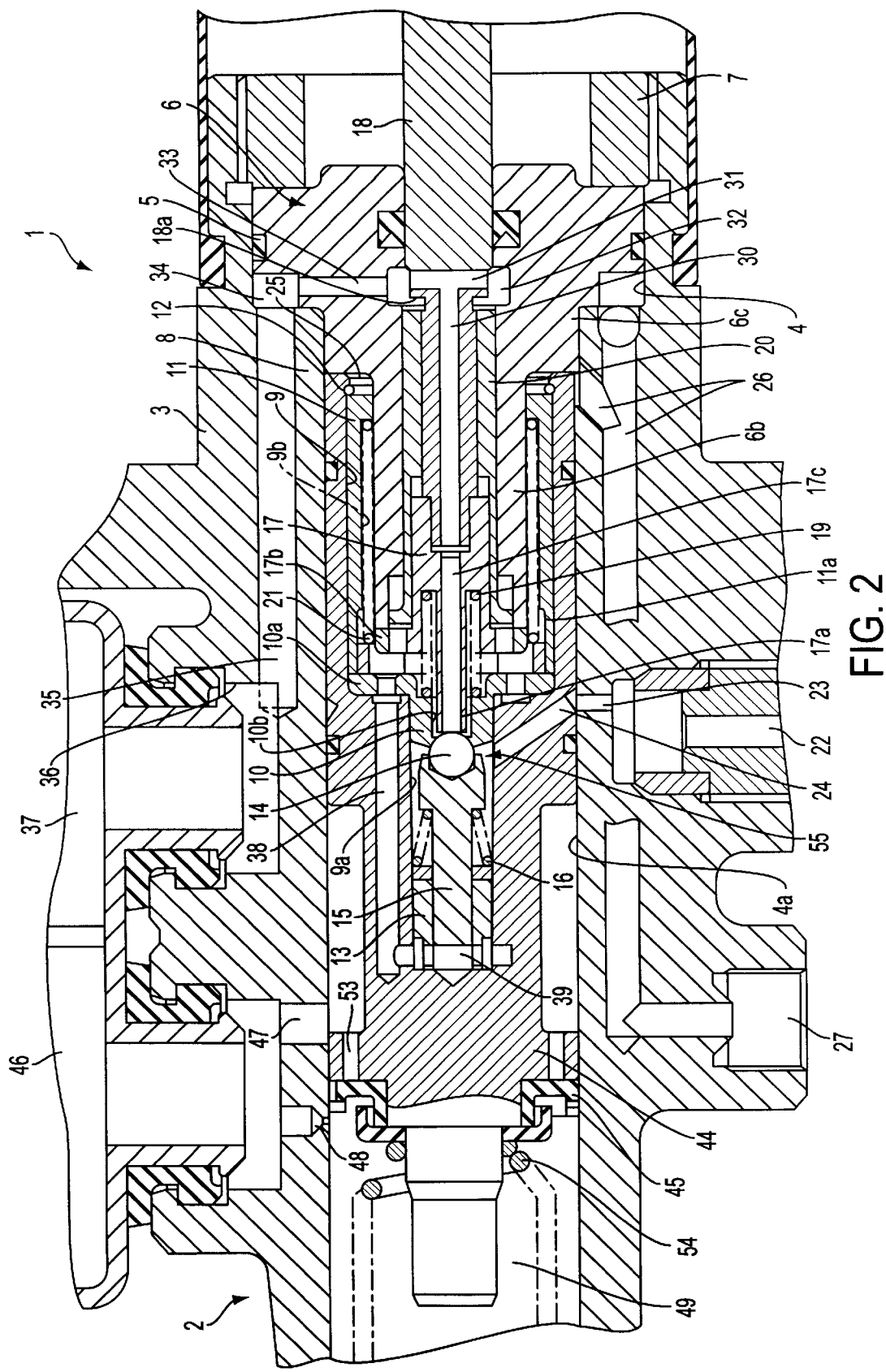
FIG. 2 is a partially enlarged cross-sectional view of FIG. 1.

FIG. 1 is a cross-sectional view showing an example of the embodiment of the hydraulic pressure type brake booster of the present invention. FIG. 2 is a partially enlarged cross-sectional view of FIG. 1.

As shown in FIGS. 1 and 2, the hydraulic pressure type booster of this example is integrated with a master cylinder 2 and provided with a housing 3 which is common between the booster 1 and this master cylinder 2.

In the housing 3, there is formed a stepped hole 4, which is relatively long in the axial direction, and this stepped hole 4 is open to the right end in FIG. 1. A small diameter portion 4a of this stepped hole 4 extends from the hydraulic type booster 1 to the master cylinder 2, wherein the cross-sectional area of the small diameter portion 4a is kept constant. A right end opening of this stepped hole 4 formed in the axial direction is closed by a plug 6 with O ring, so that it is hermetically sealed. This plug 6 is provided with a stepped cylindrical protrusion 6a, and a large diameter protrusion 6c of the stepped cylindrical protrusion 6a is press-fitted into a small diameter portion 4a of the stepped hole 4 of the housing 3 so that a small diameter protrusion 6b of this stepped cylindrical protrusion 6a can be positioned in the small diameter portion 4a. The plug 6 is made to come into contact with a step portion of the stepped hole 4 and fixed to the housing 3 with a nut 7 screwed to the housing 3.

A power piston 8 is hermetically and slidably disposed in the small diameter portion 4a of the stepped hole 4. In the power piston 8, there is formed a stepped hole 9 which is located at the center and extended in the axial direction, and this stepped hole 9 is open to the right end of the power piston 8. A cylindrical valve seat member 10, at the end of which a valve seat corresponding to the first valve seat of the present invention is disposed, is press-fitted into a small diameter portion 9a of the stepped hole 9. A flange portion 10a provided at the right end of the valve seat member 10 is made to come into contact with a step portion of the stepped hole 9, on one side and contacted in the axial direction by a cylindrical fixing member 11, engaged in a large diameter portion 9b of the stepped hole 9, on the other side, further, a cylindrical fixing member 11 is fixed to the power piston 8 by a C-shaped ring 12.

A collar 13 is press-fitted into the small diameter portion 9a of the stepped hole 9. In this collar 13, there is slidably provided a valve body 15 which supports a ball valve 14. This valve body 15 is always biased by a spring 16 in a direction in which the ball valve 14 is seated on a valve seat of the valve seat member 10. In a hole 10b of the valve seat member 10 formed in the axial direction, there is provided a cylindrical member 17 so that a valve seat disposed at the forward end, which corresponds to the second valve seat of the present invention, can be seated on the ball valve 14. The cylindrical member 17 is engaged with and fixed to the input shaft 18. This cylindrical member 17 is provided with a flange-shaped stopper 17b capable of coming into contact with a forward end of the small diameter protrusion 6b of the plug 6, wherein this flange-shaped stopper 17b restricts a limit of retraction of the input shaft 18 at the time of contact described above. That is, the conventional cylindrical member 11' described before and the cylindrical stopper 13' are formed being integrated with each other. Between the valve seat member 10 and the cylindrical member 17, there is provided a spring 19 which is contracted. By the action of this spring 19, the cylindrical member 17 and the input shaft 18 are biased to the right at all times. The input shaft 18 penetrates the plug 6 in a hermetically sealed condition, and a rear end of the input shaft 18 is connected with a brake pedal not shown in the drawing.

Figure 3:
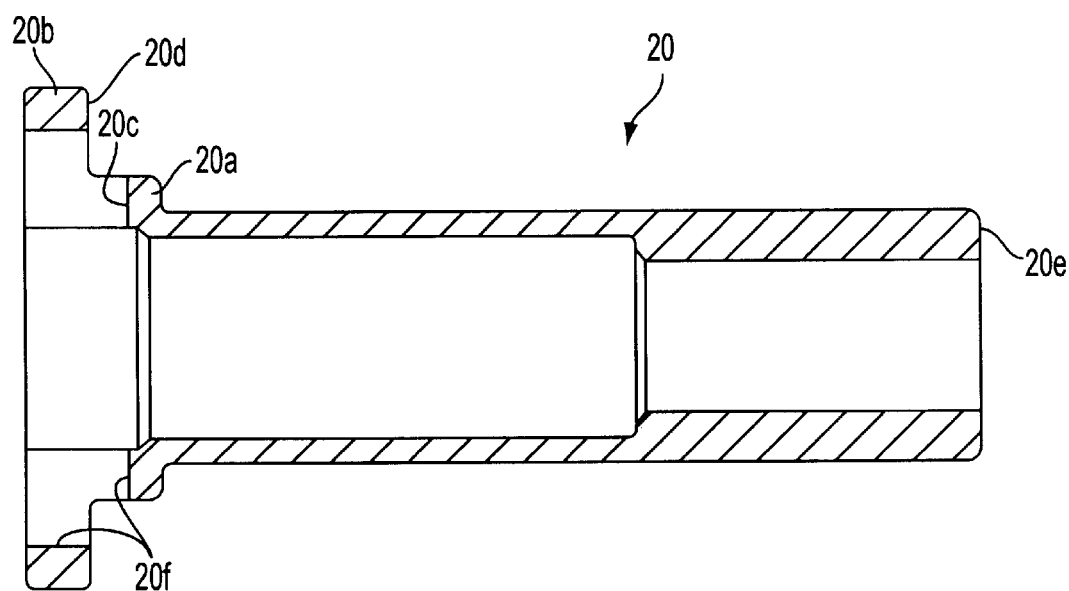
FIG. 3 is a cross-sectional view showing a reaction force piston used in the hydraulic pressure type booster shown in FIG. 1.

Between the outer circumferences of the input shaft 18 and the cylindrical member 17, and the inner circumference of the small diameter protrusion 6b of the plug 6 in the axial direction, there is slidably provided a cylindrical reaction force piston 20. As shown in FIG. 3, there are provided a first flange 20a and a second flange 20b at the left end of this reaction force piston 20. The stopper 17b is capable of coming into contact with a left side portion of the first flange 20a. When the stopper 17b comes into contact with the left side portion of the first flange 20a, the stopper 20c stops a retraction of the cylindrical member 17 with respect to the reaction force piston 20. In other words, when the stopper 17b of the cylindrical member 17 comes into contact with the stopper 20c of the reaction force piston 20, the input shaft 18 can not be retracted any more with respect to the reaction force piston 20.

A right side portion of the second flange 20b is formed into an engaging portion 20d which engages with a step portion 11a of the cylindrical fixing member 11 when the reaction force piston 20 is retracted by a predetermined distance with respect to the power piston 8. Further, a right end 20e of the reaction force piston 20 is capable of coming into contact with a step portion 18a of the input shaft 18. Between the second flange 20b of the reaction piston 20 and the cylindrical fixing member 11, there is provided a spring 21 which is in a contracted condition. By the action of this spring 21, the second flange 20b of the reaction piston 20 is usually contacted with the flange 10a of the valve seat member 10.

Further, in the housing 3, there are provided an input port 22 from which hydraulic fluid is introduced and a passage hole 23 by which this input port 22 and the small diameter portion 4a of the stepped hole 4 are communicated with each other. In the power piston 8, there is formed a passage hole 24 which communicates the passage hole 23 with the small diameter portion 9a of the stepped hole 9. In this case, the passage hole 24 is open to the small diameter portion 9a between the valve seat member 10 and the collar 13. A hydraulic pressure supply passage is composed of the input port 22 and the passage holes 23, 24.

There is formed a power chamber 25 in the small diameter portion 4a of the stepped hole 4 between the plug 6 and the right end of the power piston 8. This power chamber 25 is communicated with an axial direction hole 10b of the valve seat member 10 at all times. In this power chamber 25, there is provided a stopper 17b of the cylindrical member 17, and also there are provided a first flange 20a and a second flange 20b of the reaction force piston 20. In this connection, there is provided a clearance between the outer circumferential surface of the small diameter protrusion 6b of the plug 6 and the inner circumferential surface of the cylindrical fixing member 11. Therefore, hydraulic fluid can freely flow between both sides of the cylindrical fixing member 11 in the axial direction. The power chamber 25 is always communicated with the output port 27 via the passage hole 26 formed in the housing 3. This output port 27 is always communicated wheel cylinders 28, 29 in one of the two brake systems.

The axial direction hole 17c of the cylindrical member 17, both ends of which are open, is always communicated with the discharge port 36 via an axial direction passage hole 30 formed in the input shaft 18, a radial direction passage hole 31 formed in the input shaft 18, an annular groove 32 formed in the plug 6, a radial direction passage hole 33 formed in the plug 6, an annular chamber 34 formed between the plug 6 and the housing 3, and an axial direction passage hole 35 formed in the housing 3. This discharge port 36 is always communicated with the reservoir 37 used for the hydraulic pressure type booster.

Further, the power chamber 25 is always communicated with a chamber 39, which faces a left end of the valve body 15, via an axial direction passage hole 38 formed in the power piston 8.

Further, in the hydraulic pressure circuit connecting the input port 22 with the reservoir 37 used for the hydraulic pressure type booster, there are respectively provided a hydraulic pump 41 driven by a motor 40, and an accumulator 43 disposed on the delivery side of the hydraulic pump 41 via a check valve 42. A predetermined intensity of pressure is accumulated in the accumulator 43 by the discharge pressure of the hydraulic pump 41 at all times.

On the other hand, in the front of the power piston 8, there is integrally provided a master cylinder piston 44 of the master cylinder 2. An effective pressure receiving area of the master cylinder piston 44 is the same as that of the power piston 8, and the master cylinder piston 44 is hermetically and slidably engaged with the small diameter portion 4a of the stepped hole 4 of the housing 3 by a cup seal 45. In this case, the master cylinder piston 44 and the small diameter portion 4a of the stepped hole 4 of the housing 3 are hermetically sealed only in one direction.

A reservoir 46 for the master cylinder is attached to the housing 3. In the housing 3, there is provided a brake fluid supply port 47 for communicating the reservoir 46 for the master cylinder with the small diameter portion 4a of the stepped hole 4, and also there is provided a compensation port 48. In the small diameter portion 4a, a fluid chamber 49 is formed by the master cylinder piston 44. This fluid chamber 49 is always communicated with wheel cylinders 51, 52 in the other of the two brake systems via the output port 50. When the cup seal 45 attached at the forward end of the master cylinder piston 44 is located at a non-operating position on the right of the opening end of the compensation port 48, the hydraulic chamber 49 is communicated with the reservoir 46 for the master cylinder. Therefore, master cylinder pressure is not generated in the hydraulic chamber 49. However, when the cup seal 45 attached at the forward end of the master cylinder piston 44 proceeds to the left of the opening end of the compensation port 48, master cylinder pressure is generated in the hydraulic chamber 49. Further, brake fluid in the reservoir 46 for the master cylinder can be supplied to the hydraulic chamber 49 via a brake fluid supply port 47 formed in the housing 3 and the axial direction hole 53 formed in the master cylinder piston 44.

Further, in the hydraulic chamber 49, there is provided a return spring 54 which always biases the power piston 8 integrated with the master cylinder piston 44 in the non-operating direction, wherein the return spring 54 is disposed being contracted.

As described above, the brake system using the hydraulic pressure type booster integrated with the master cylinder 2 of the present invention is composed of a semi-full power brake system in which hydraulic pressure of the power chamber 25 is introduced into the wheel cylinders 28, 29 of one brake system, and at the same time master cylinder pressure is introduced into the wheel cylinders 51, 52 in the other brake system.

Next, operation of the hydraulic pressure type booster integrated with the master cylinder of this example will be explained below. When the brake pedal is not put on, that is, when the brake is not operated, the ball valve 14, the valve seat of the valve seat member 10 and the valve seat 17a of the cylindrical member 17 are set in a positional relation shown in FIGS. 1 and 2. That is, the ball valve 14 is seated on the valve seat of the valve seat member 10, and the valve seat 17a of the cylindrical member 17 is unseated from the ball valve 14. In the above condition, the passage hole 24, which is always communicated with the input port 22, is shut off from the axial direction hole 10b of the valve seat member 10, and the axial direction hole 10b of the valve seat member 10 is communicated with the axial direction hole 17c of the cylindrical member 10 which is always communicated with the discharge port 36. Accordingly, when the brake is not operated, the power chamber 25 is shut off from the pump 41 and the accumulator 43 and communicated with the reservoir 37 for the hydraulic pressure type booster. Therefore, no hydraulic fluid is supplied to the power chamber 25.

A right end 20e of the reaction force piston 20 is separate from the step portion 18a of the input shaft 18. A stopper 17b of the cylindrical member 17 is contacted with a small diameter protrusion 6b of the plug 6 and separate from a stopper 20c of the first flange 20a of the reaction force piston 20. Therefore, the stopper 17b of the cylindrical member 17 is set at a position ahead of the stopper 20c.

When the brake pedal is put on, that is, when the brake is operated, the input shaft 18 proceeds and the valve seat 17a of the cylindrical member 17 is seated at the ball valve 14, and at the same time the ball valve 14 is unseated from the valve seat of the valve seat member 10. Therefore, the passage hole 24 and the axial direction hole 10b of the valve seat member 10 are communicated with each other under the above condition, and at the same time the axial direction hole 10b of the valve seat member 10 is shut off from the axial direction hole 17c of the cylindrical member 17. Accordingly, the passage is shut off from the reservoir 37 for the hydraulic pressure type booster, and the power chamber 25 is communicated with the pump 41 and the accumulator 43. Therefore, hydraulic fluid is supplied from the accumulator 43 to the power chamber 25. In this case, a control valve 55 of the hydraulic pressure type booster 1 is composed, in which the power chamber 25 is selectively changed over to between the hydraulic pressure source composed of the pump 41 and the accumulator 43, and the reservoir 37 for the hydraulic pressure type booster, wherein the changeover is conducted by the ball valve 14, the valve seat of the valve seat member 10 and the valve seat 17a of the cylindrical member 17.

When pressure of hydraulic fluid introduced into the power chamber 25 is raised to a value higher than a spring force of the spring 54, the power piston 8 and the master cylinder piston 44 are moved forward by the hydraulic pressure, so that a master cylinder pressure is generated in the hydraulic chamber 49. Then, hydraulic pressure in the power chamber 25 is introduced into both wheel cylinders 28, 29 of one of the brake systems, and at the same time hydraulic pressure in the master cylinder is introduced into both wheel cylinders 51, 52 of the other brake system. In this way, the brakes of both brake systems are operated. In this case, the effective pressure receiving area of the power piston 8, upon which hydraulic pressure in the power chamber 25 acts, is equal to that of the master cylinder piston 44 which receives the master cylinder pressure in the hydraulic chamber 49. Therefore, hydraulic pressure in the power chamber 25 and hydraulic pressure of the master cylinder balance with each other and become the same value. Accordingly, hydraulic fluid of the same pressure is supplied to all wheel cylinders 28, 29, 512, 52.

By the hydraulic pressure in the power chamber 25, the reaction force piston 20 is relatively displaced with respect to the power piston 8 and the input shaft 18, resisting a spring force generated by the spring 21. However, at the initial stage in which hydraulic pressure in the power chamber 25 is relatively low, a rear end 20e of the reaction force piston 20 does not come into contact with the step portion 18a of the input shaft 18.

Further, hydraulic fluid in the power chamber 25 is also introduced into the chamber 39 via the axial direction passage hole 38. The valve body 15 is biased by hydraulic pressure in the chamber 39 in a direction in which the movement of the valve body 15 resists the pressure in the power chamber 25.

Because of the loss stroke of each wheel cylinder 28, 29, 51, 52, no brake force is substantially generated in each wheel cylinder at the initial stage of operation. In this initial stage of operation, a right end 20e of the reaction force piston 20 does not come into contact with the step portion 18a of the input shaft 18. Therefore, no force is given to the input shaft 18 by the reaction force piston 20. Consequently, the input shaft 18 is given a force generated by the hydraulic pressure in the power chamber 25 which a relatively small effective pressure receiving area of the cylindrical member 17 receives. This force is transmitted to a driver as a reaction force.

When the reaction force of the input shaft 18 becomes equal to the input force given to the input shaft 18, the ball valve 14 is seated on both the valve seat of the valve seat member 10 and the valve seat 17a of the cylindrical member 17, and the power chamber 25 is shut off from both the accumulator 43 and the reservoir 37 for the hydraulic pressure type booster. When the input of the input shaft 18 is further increased, the ball valve 14 is unseated again from the valve seat of the valve seat member 10, and hydraulic fluid is further supplied into the power chamber 25. Therefore, hydraulic pressure in the power chamber 25 is further raised. After that, when the ball valve 14 is repeatedly seated to and unseated from the valve seat of the valve seat member 10, hydraulic pressure in the power chamber 25 is continuously increased by a predetermined ratio of multiplication in accordance with an increase in the input given to the input shaft 18.

In the initial stage in which an intensity of input is low, the right end 20e of the reaction force piston 20 is not contacted with the step portion 18a of the input shaft 18. Therefore, the effective pressure receiving area of the input shaft 18, upon which hydraulic pressure in the power chamber 25 is acting, is small. Consequently, the ratio of multiplication is high at this time. For the above reasons, an output of the hydraulic pressure type booster 1 is greatly increased with respect to the input of the input shaft 18 by a high ratio of multiplication. In this way, the hydraulic pressure type booster 1 conducts what is called a jumping action.

When hydraulic pressure in the power chamber 25 is further increased and the power piston 8 is further moved forward, the stroke loss of each cylinder 28, 29, 51, 52 is eliminated. Then, each wheel cylinder 28, 29, 51, 52 generates a brake force, that is, the brakes are substantially operated. In the above condition, the right end 20e of the reaction force piston 20 comes into contact with the step portion 18a of the input shaft 18, and there action force piston 20 gives a force to the input shaft 18 by a biasing force generated by hydraulic pressure in the power chamber 20, wherein the force is given to the input shaft 18 by the reaction force piston 20 in such a manner that it is opposed to the input given to the input shaft 18. Accordingly, an intensity of reaction force acting upon the input shaft 18 is increased, and an output of the hydraulic pressure type booster 1 is increased with respect to the input given to the input shaft 18, wherein an increase in the output of the hydraulic pressure type booster 1 is smaller than that in the loss stroke. In this way, the jumping action is completed. Since an intensity of reaction force is increased, an input of the input shaft 18 is multiplied by a relatively low ratio of multiplication and outputted by the hydraulic pressure type booster 1, and an intensity of hydraulic pressure in the power chamber 25 becomes a value which corresponds to this ratio of multiplication. A high intensity of brake force is generated in each wheel cylinder 28, 29, 51, 52 corresponding to the input given to each input shaft. By the above brake force generated by each wheel cylinder, the brakes are operated. As described before, at this time, hydraulic pressure in the power chamber 30 and hydraulic pressure in the master cylinder balance with each other and become the same value. Therefore, the brake forces generated by the wheel cylinders 33, 34, 58, 59 also become equal to each other.

When the brake pedal is released so as to stop the operation of the brakes, both the input shaft 18 and the cylindrical member 17 are retracted to the right, and the valve seat 17a of control valve 55 is unseated from the ball valve 14, so that the power chamber 25 can be communicated with the reservoir 37 for the hydraulic pressure type booster. Accordingly, hydraulic fluid in the power chamber 25 passes through the axial direction hole 10b of the valve seat member 10, the clearance between the ball valve 14 and the valve seat 17a, the axial direction hole 17c of the cylindrical member 17, the axial direction hole 30 and the radial direction hole 31 of the input shaft 18, the annular groove 32 and the radial direction passage hole 32 of the plug 6, the annular space 34 between the plug 6 and the housing 3, the axial direction passage 35 of the housing 3, and the discharge port 36. Then, hydraulic fluid is discharged into the reservoir 37 for the hydraulic pressure type booster. At this time, the input shaft 18 is greatly retracted until the stopper 17b of the cylindrical member 17 comes into contact with the stopper 20c of the reaction force piston 20. Therefore, the valve seat 17a is greatly separated from the ball valve 14, so that hydraulic fluid can be quickly discharged from the power chamber 25.

When hydraulic fluid is discharged from the power chamber 25, hydraulic fluid in both wheel cylinders 28, 29 in one of the brake systems also quickly passes through the power chamber 25 and is discharged into the reservoir 37 for the hydraulic pressure type booster. At the same time, the power piston 8 integrated with the master cylinder piston 44 is quickly retracted by a spring force generated by the return spring 54. When the power piston 8 is retracted as described above, the master cylinder piston 44 is also quickly retracted, and the hydraulic chamber 49 of the master cylinder 2 is communicated with the reservoir 46 for the master cylinder. Therefore, hydraulic fluid in both wheel cylinders 51, 52 of the other brake system quickly passes through the hydraulic chamber 49 and is discharged into the reservoir 46 for the master cylinder. Due to the foregoing, release of the brake is quickly started.

When hydraulic pressure in the power chamber 25 is decreased to a predetermined value, the reaction force piston 20 relatively proceeds with respect to the power piston 8 and the input shaft 18 by a spring force generated by the spring 21. Accordingly, the reaction force piston 20 comes into contact with the flange portion 10a of the valve seat member 10, and the right end 20e of the reaction force piston 20 is separated from the step portion 18a of the input shaft 18.

When the input shaft 18 is further retracted until the brakes is substantially completely released, the stopper 17a of the cylindrical member 17 comes into contact with a forward end of the small diameter protrusion 6b of the plug 6. Due to the foregoing, retraction of both the input shaft 18 and the cylindrical member 17 is stopped, that is, both the input shaft 18 and the cylindrical member 17 reach a limit of retraction. However, even when retraction of both the input shaft 18 and the cylindrical member 17 is stopped, all of the power piston 8, reaction force piston 20, ball valve 14 and valve seat member 10 continue to retract. Therefore, the stopper 17b of the cylindrical member 17 is separated from the stopper 20c of the reaction force piston 20, and at the same time the ball valve 14 approaches the valve seat 17a of the cylindrical member 17.

When the right end of the power piston 8 comes into contact with the plug 6, retraction of the power piston 8 is stopped, and the power piston 8 integrated with the master cylinder piston 44 is located at the non-operating position, so that the brake can be quickly and completely released. In the above state, the ball valve 14 becomes very close to the valve seat 17a of the cylindrical member 17, and a clearance between the ball valve 14 and the valve seat 17a becomes very small, that is, the ball valve 14 is immediately before seating. Accordingly, when the brake pedal is put on and the input shaft 18 and the cylindrical member 17 are moved forward, the valve seat 17a is immediately seated to the ball valve 14, and at the same time the ball valve 14 is immediately unseated from the valve seat of the valve seat member 10. That is, a loss stroke for changing over the control valve 55 is extremely reduced, and the brakes are quickly operated.

As described above, when a driver puts on the brake, it can be quickly operated, and when the driver releases the brake, it can be quickly released. In this way, the hydraulic pressure type booster can be operated in quick response.

According to the hydraulic pressure type booster 1 of this example, both the collar 13 to support and guide the valve body 15 and the valve seat member 10 are press-fitted into the small diameter portion 9a of the stepped hole 9 of the power piston 8, and the plug 6 is press-fitted into the small diameter portion 4a of the stepped hole 4 of the housing 3 and held in a hermetical condition. Due to the above structure, it is unnecessary to provide O rings in these portions. Accordingly, it is unnecessary to provide spaces in which O rings are installed. Therefore, it is possible to reduce dimensions of the collar 13, the valve seat member 10 and the plug 6 in the radial and the axial direction. Due to the foregoing, the hydraulic pressure type booster 1 can be made compact in the radial and the axial direction. Further, it is unnecessary to provide O rings, and it is also unnecessary to conduct machining of O ring grooves.

Since the diameters of the collar 13, the valve seat member 10 and the plug 6 can be reduced, the diameter of the power piston can be also reduced. When the power piston 8 is integrated with the master cylinder piston 44 and further the effective pressure receiving areas of both pistons 8, 44 are made to be the same, in the case of semi-full power braking operation, hydraulic pressure introduced from the power chamber 25 into both wheel cylinders 28, 29 in one of the brake systems can be balanced with master cylinder pressure introduced into both wheel cylinders 51, 52 of the other brake system, that is, hydraulic pressure introduced from the power chamber 25 into both wheel cylinders 28, 29 can be made to be the same as master cylinder pressure introduced into both wheel cylinders 51, 52 of the other brake system. Therefore, brake pressure of each wheel cylinder 28, 29, 51, 52 can be made equal to each other. Accordingly, irrespective of the piping of the brake system such as X piping, the brake force of each wheel can be distributed in a well balanced condition. Therefore, braking operation of a vehicle can be appropriately conducted.

Further, since the power piston 8 and the master cylinder piston 44 are integrated with each other, they can have one return spring 54 in common. For the above reasons, it is possible to reduce the number of parts compared with a conventional structure in which the return spring of the power piston 8 and that of the master cylinder piston 44 are differently disposed.

Figure 4:
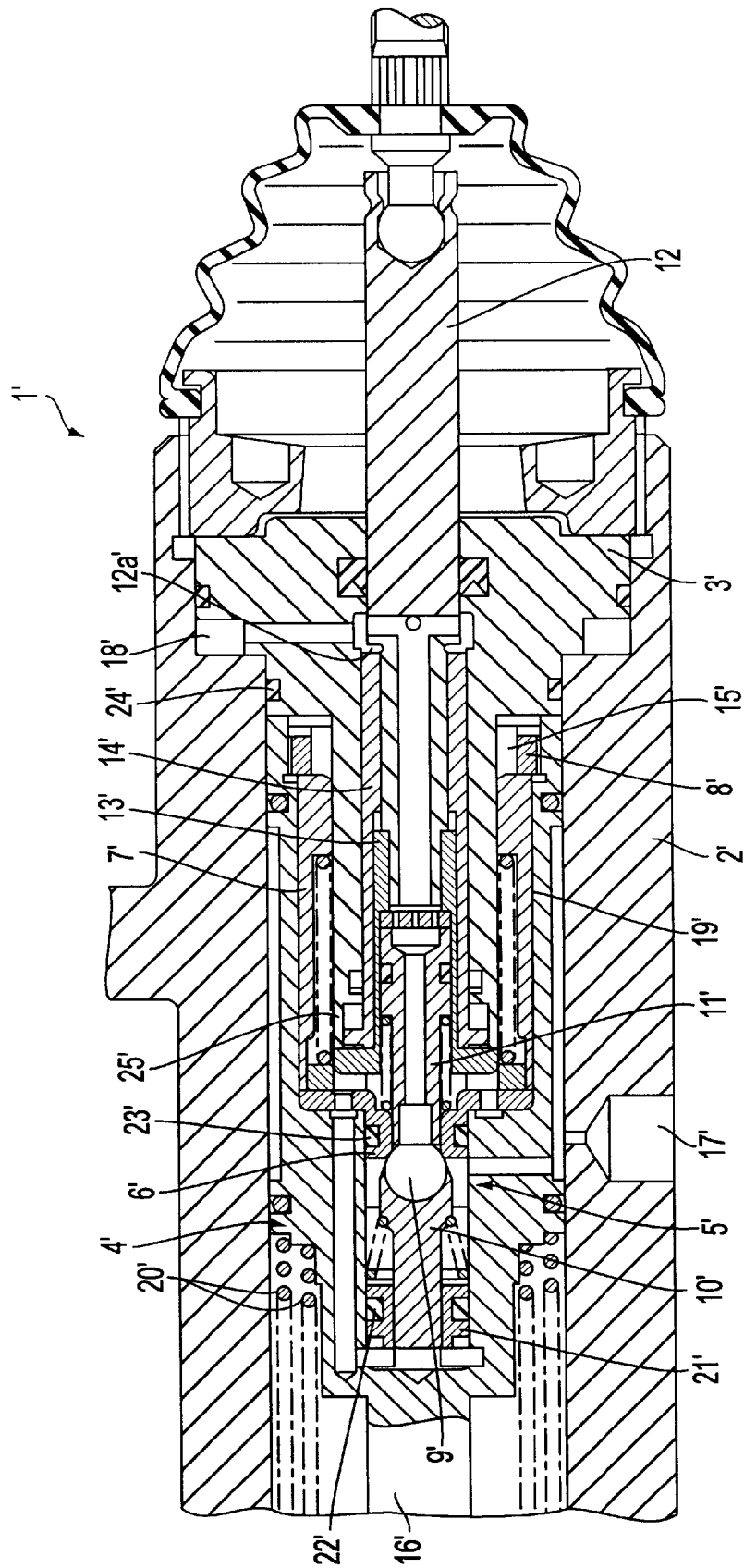
FIG. 4 is a partially cross-sectional view showing a portion of the conventional hydraulic pressure type booster.

According to the hydraulic pressure type booster 1 of this example, since the stopper 17b is integrally formed in the cylindrical member 17, it becomes unnecessary to provide a cylindrical stopper member 13' of the conventional hydraulic pressure type booster shown in FIG. 4. Due to the foregoing, it is possible to simplify the structure of the valve seat portion of the cylindrical member 17, and also it is possible to simplify the structure of the restricting portion to restrict the limit of retraction of the input shaft 18. Further, the number of parts can be reduced. Furthermore, assembling work of this cylindrical member 17 can be simplified.

Further, since the cylindrical member 17 and the stopper 17b are integrated with each other, relative positions between the valve seat 17a of the cylindrical member 17 and the stopper 17b can be precisely determined. Accordingly, it is possible to precisely and stably ensure a clearance between the ball valve 14 and the valve seat 17a at the position of limit of retraction of the input shaft 18. Therefore, it is possible to prevent the fluctuation of this clearance.

Further, according to the hydraulic pressure type booster 1 of the invention, the cylindrical fixing member 11 is fixed to the power piston 8 with C ring 12. Therefore, compared with the conventional case in which the cylindrical fixing member 7' is fixed with the nut 8', it is possible to reduce the overall length of the hydraulic pressure type booster 2. Further, since C ring 12 can be attached more easily than the nut, the assembling property can be enhanced.

Further, the housing of the hydraulic pressure type booster 1 and the power piston 8 are integrated with each other, and the housing of the master cylinder 2 and the master cylinder piston 44 are integrated with each other. Therefore, the overall length of an assembling body in which the hydraulic pressure type booster 1 and the master cylinder 2 are assembled can be shortened, and further the number of parts can be reduced. Due to the foregoing, the structure of this assembling body can be simplified, and furthermore the manufacturing cost can be decreased.

In this connection, in the above example, the hydraulic pressure type booster 1 and the master cylinder 2 are formed being integrated with each other. However, it should be noted that it is possible to apply the present invention to the hydraulic pressure type booster 1 formed separately from the master cylinder 2.

As can be seen in the above explanations, according to one embodiment of the hydraulic pressure type booster of the present invention, the collar, the valve member and the plug are respectively press-fitted into holes corresponding to them. Therefore, it is unnecessary to provide sealing members such as O ring. Due to the above structure, it is possible to make the hydraulic pressure type booster compact in the radial and the axial direction. Since the sealing members are not required, the number of parts can be reduced, and further the process in which the sealing members are attached can be eliminated.

According to another embodiment of the present invention, the stopper to restrict the limit of retraction of the input shaft is integrated with the cylindrical member. Accordingly, the structure of the second valve seat of the cylindrical member and the structure of the restricting portion to restrict retraction of the input shaft can be simplified, and the number of parts can be further reduced, and furthermore assembling work of this cylindrical member can be simplified.

Since the cylindrical member is integrated with the stopper, it is possible to precisely determine relative positions of the second valve seat of the cylindrical member and the stopper. Therefore, it is possible to precisely and stably ensure a clearance between the valve of the control valve and the second valve seat at the limit position of retraction of the input shaft. Accordingly, it is possible to prevent the occurrence of fluctuation of this clearance.

According to yet another embodiment the invention, the cylindrical member is fixed to the power piston by the snap ring. Accordingly, compared with a conventional case in which the cylindrical member is fixed with a nut, the total length of the hydraulic pressure type booster can be shortened, and the assembling property can be enhanced because the snap ring can be attached more easily than the nut.

What is claimed is:

1. A hydraulic pressure type booster comprising:

a hydraulic pressure source for generating hydraulic pressure;

a reservoir for storing hydraulic fluid;

an input shaft operated upon inputting power;

a control valve operated by said input shaft;

a power chamber, being shut off from said hydraulic pressure source and communicated with said reservoir when said control valve is not operated, and being shut off from said reservoir and communicated with said hydraulic pressure source when said control valve is operated, so that hydraulic pressure is introduced into said power chamber from said hydraulic pressure source;

a power piston operated by hydraulic pressure in said power chamber, said control valve being disposed in said power piston;

a collar engaged in a first hole formed in said power piston; and a valve seat member engaged in said first hole, said control valve including:

a valve body which is slidably guided and supported by said collar;

a valve supported by said valve body;

a first valve seat, said first valve seat being formed in said valve seat member, said valve being seated to and unseated from said first valve seat, said valve being seated to said first valve seat so that said hydraulic pressure source and said power chamber are shut off from each other when said control valve is not operated, said valve being unseated from said first valve seat so that said hydraulic pressure source and said power chamber are communicated with each other when said control valve is operated; and a second valve seat is disposed in a cylindrical member connected with said input shaft, said valve being seated to and unseated from said second valve seat, said valve being unseated from said second valve seat so that said power chamber and said reservoir is communicated with each other when said control valve is not operated, said valve being seated to said second valve seat so that said power chamber and said reservoir is shut off from each other when said control valve is operated;

wherein said power chamber is formed when a second hole in a housing is closed by a plug, and wherein at least two of said collar, valve seat member and plug are press-fitted into corresponding holes.

2. A hydraulic pressure type booster claimed in claim 1, wherein a stopper section to restrict a limit of retraction of said input shaft when it comes into contact with said plug is integrally formed in said cylindrical member.

3. A hydraulic presser type booster as claimed in claim 2, wherein a cylindrical fixing member is disposed in said hole of said power piston, and said cylindrical fixing member is fixed in the axial direction by a snap ring attached onto an inner surface of said hole of said power piston.

4. A hydraulic pressure type booster claimed in claim 1, wherein a cylindrical fixing member is disposed in said hole of said power piston, and said cylindrical fixing member is fixed in the axial direction by a snap ring attached onto an inner surface of said hole of said power piston.

5. A hydraulic pressure type booster claimed in claim 1, wherein a stopper section in the form of a flange is integrally formed in said cylindrical member, said stopper section being in contact with a tip surface of said plug in a nonactive state.

6. A hydraulic pressure type booster claimed in claim 1, further comprising a master cylinder piston monolithic with said power piston.

7. A hydraulic pressure type booster claimed in claim 6, wherein effective pressure receiving areas of said power piston and said master cylinder piston are equal.

8. A hydraulic pressure type booster, comprising:

a hydraulic pressure source outputting a pressurized fluid and a reservoir for storing hydraulic fluid;

a housing having a stepped hole formed therein, said stepped hole having a small diameter portion and a large diameter portion;

a plurality of passage holes formed in said housing, said plurality of passage holes in communication with at least one of an input port of said housing and an output port of said housing;

a power chamber formed within said small diameter portion of said housing;

a power piston disposed within said small diameter portion of said housing stepped-hole, said power piston defining a stepped hole in an interior thereof, said power-piston stepped-hole having a small diameter portion and a large diameter portion;

a plug having a first portion corresponding to said small diameter portion of said housing stepped hole and a second portion corresponding to said large diameter portion of said housing stepped hole, said plug defining at least a first pressure boundary at said small diameter portion of said housing stepped hole and said plug having an opening therethough;

an input shaft disposed at least partially within said opening in said plug;

a cylindrical valve seat member disposed within said power piston, said cylindrical valve seat member having a first portion defining a first valve seat disposed within said small diameter portion of said power piston and having a second portion defining a flange disposed within said large diameter portion of said power piston;

a control valve provided within said power piston, said control valve further comprising:
- a valve body movably provided within a collar, said collar disposed within said small diameter portion of said power piston; and
- a valve supported by said valve body and biased toward said first valve seat by a spring;

a cylindrical member connected to said input shaft, said cylindrical member further comprising:
- a second valve seat biased away from said valve by a spring,
- a hole formed axially through said second valve seat and said cylindrical member; and
- a stopper portion having a surface opposite to a portion of said plug and movably provided between said portion of said plug and said cylindrical-valve-seat-member second portion, wherein at least two of said collar, said first portion of said cylindrical valve seat member, and said first portion of said plug are press-fitted into corresponding ones of a respective small diameter portion of said stepped hole in said power piston and a respective small diameter portion of said stepped hole of said housing, and wherein when said input shaft is moved a predetermined distance in a direction toward said valve, said second valve seat contacts said valve and displaces said valve away from said first valve seat, establishing communication between said hydraulic fluid output by said hydraulic pressure source and said power chamber to permit flow of said pressurized fluid into said power chamber, wherein said pressurized fluid in said power chamber acts upon a pressure receiving surface of said power piston and moves said power piston axially within said small diameter portion of said stepped hole of said housing, and wherein, when said input shaft is moved a predetermined distance in a direction away from said valve, said valve biased toward said first valve seat is brought into contact with said first valve seat, preventing communication between said hydraulic fluid output by said hydraulic pressure source and said power chamber to allow said pressurized fluid in said power chamber to discharge into said reservoir.

9. A hydraulic pressure type booster claimed in claim 8, further comprising a master cylinder piston monolithic with said power piston.

10. A hydraulic pressure type booster claimed in claim 9, wherein effective pressure receiving areas of said power piston and said master cylinder piston are equal.

* * * * *